United States Patent [19]

Gelardi

[11] Patent Number: 4,694,557

[45] Date of Patent: Sep. 22, 1987

[54] LEADER TAPE STAKING ROD AND RELATED METHOD OF ASSEMBLY

[75] Inventor: Anthony L. Gelardi, Cape Porpoise, Me.

[73] Assignee: Shape Inc., Biddeford, Me.

[21] Appl. No.: 843,688

[22] Filed: Mar. 25, 1986

[51] Int. Cl.⁴ ............... B23P 19/02; G11B 23/107
[52] U.S. Cl. ....................... 29/525; 242/197; 242/195
[58] Field of Search ........... 242/195, 197, 74.1, 242/74; 226/91, 92; 24/168, 170, 460, 461, 473; 138/44; 29/525, 526 R, 806

[56] References Cited

U.S. PATENT DOCUMENTS

| | | | |
|---|---|---|---|
| 2,397,382 | 3/1946 | Smith | 29/525 |
| 3,802,638 | 4/1974 | Dragan | 242/74 |
| 4,213,578 | 7/1980 | Katata | 242/74 |
| 4,226,382 | 10/1980 | Watanabe | 242/74 |
| 4,283,026 | 8/1981 | Werner | 242/74 X |
| 4,383,660 | 5/1983 | Richard et al. | 242/197 |
| 4,426,047 | 1/1984 | Richard et al. | 242/197 |
| 4,452,406 | 6/1984 | Richard | 242/195 |

FOREIGN PATENT DOCUMENTS 288020  5/1914  Fed. Rep. of Germany ..... 242/74.1

Primary Examiner—John M. Jillons
Attorney, Agent, or Firm—Staas & Halsey

[57] ABSTRACT

A leader tape staking rod and related method of assembly are provided. The staking rod includes an injection molded, elongated member having two opposing, substantially flat sides, two opposing, substantially curved sides, a first end and a second end, and a square-shaped opening formed through the elongated member from the first end to the second end. The method uses a tool having a corresponding square-shaped tip for engaging and transporting the staking rod to the vicinity of the leader block which receives the leader tape in a substantially cylindrical opening. The staking rod is then inserted into the opening formed in the leader block in a direction perpendicular to the longitudinal axis of the opening with its two opposing, substantially flat sides adjacent the mouth of the opening. The staking rod is then rotated about the longitudinal axis of the opening formed in the leader block by the tool to a point where its two opposing, substantially curved sides create an interference fit with the walls of the opening formed in the leader block, permanently trapping the leader tape in position. The tool is then withdrawn in a direction colinear with the longitudinal axis of the opening.

8 Claims, 5 Drawing Figures

LEADER TAPE STAKING ROD AND RELATED METHOD OF ASSEMBLY

BACKGROUND OF THE INVENTION

This invention relates to a magnetic tape cartridge, and more particularly, to a means for holding a leader tape within a leader block of a single reel tape cartridge.

Single reel tape cartridges are known in the art as evidenced by U.S. Pat. Nos. 4,383,660; 4,452,406; and 4,426,047, issued to RICHARD et al. More particularly, as shown in FIG. 1 included herewith, a single reel tape cartridge 10 includes a reel hub 12 containing a plurality of layers of a magnetic tape 14 with a leader block 16 attached to the free end or leader 15 of the tape 14 extending from the reel hub 12. A leader block window 18 permits the tape 14 to exit the tape cartridge 10 when the leader block 16 is removed from the corner 11 for threading through an external tape drive (not shown) when the leader block 16 is moved in the direction of the arrow 17. The window 18 is covered by the leader block 16 when the leader block 16 is snapped into a well 20 formed at the corner 11 of the tape cartridge 10, thus preventing contamination of the tape 14.

It is common in this art for the leader tape 15 to be mechanically fixed to the leader block 16 by a cylindrical pin or staking rod 22 fit into a corresponding opening 24 formed in the leader block 16. Several methods are known for introducing a staking rod 22 into the leader block 16.

For example, the leader tape 15 may be fixed to the leader block 16 by an extruded, round stock of ether-based polyurethane supplied in the form of a continuous roll. The stock is mechanically picked up and advanced to a position above the leader tape 15 and leader block 16. Next, the staking rod is cut free of the continuous roll and is forced into the opening 24 formed in the leader block 16 in a direction colinear with the axis of the opening.

The drawbacks of this method are as follows. First, an extruded staking rod is difficult to produce with accurate, round, outside diameters. Second, the process of winding the continuous extruded stock on spools is difficult to accomplish without unwanted stressing and stretching of the stock. Third, it is difficult to cut the stock consistently. Fourth, and most importantly, it is difficult to maintain adequate control of the stock/staking rod during cutting and insertion. This last drawback, combined with the sensitivity of the tape and the compression required to insert the staking rod 22 in the opening 24, lead to frequent problems, such as misoriented, damaged and broken tape.

U.S. Pat. No. 4,283,026, issued to WERNER, shows another method of securing the leader tape. According to this patent, a clamping member is pressed into an opening via a specially designed tool and withdrawn, if necessary, by a second, different tool. Since the leader tape is being pushed while the clamping member is being forced into the opening, this method is also characterized by misoriented, damaged or broken tape. In addition, this method is not efficiently adapted to automation because engagement and control of the clamping member is difficult. Of course, due to the high volume in which tape cartridges are sold, efficient automation is a prerequisite to the success of a method for inserting a staking rod.

U.S. Pat. No. 4,213,578, issued to KATATA, shows another method, including a tape locking piece which is also fit within an opening formed in a tape reel in a direction perpendicular to the axis of the opening. The tape locking device has an elongated elliptical cross-section, wherein the relatively straight sides are inserted adjacent the relatively narrow mouth of the opening and the device is turned to fit a wider inner portion of the opening. However, this method also does not lend itself efficiently to automation because it is difficult to control the tape locking device during insertion.

In light of the above, it is clear that a number of diverse methods are currently employed to secure leader tape within a leader block, each of which is characterized by a number of drawbacks from an automation point of view. As a result, a need still exists for a more efficient method.

SUMMARY OF THE INVENTION

Accordingly, it is an object of the present invention to provide a staking rod for a tape cartridge capable of being manufactured and installed at a relatively low cost and yet providing superior holding of the leader tape relative to the leader block in comparison to the prior art.

It is another object of the present invention to provide an economical, high quality leader block assembly and tape cartridge which can be efficiently formed and assembled by automation.

It is another object of the present invention to provide a method for assembly using a particularly configured staking rod for receiving a single, correspondingly configured tool to properly insert or remove the staking rod relative to the leader block in a manner most conducive to automation.

Finally, it is an object of the present invention to provide a method for assembly characterized by better control of the staking rod during insertion, thus eliminating leader tape damage.

Additional objects and advantages of the invention will be set forth in part in the description which follows, and, in part will be obvious from the description, or may be learned by practice of the invention. The objects and advantages of the invention may be realized and obtained by means of the instrumentalities and combinations particularly pointed out in the appended claims.

To achieve the foregoing and other objects of the present invention and in accordance with the purposes of the invention, the present invention is an improved leader tape staking rod and related method of assembly. The staking rod includes an elongated, injection molded member having two opposing, substantially flat, longitudinal sides, two opposing substantially curved, longitudinal sides, a first end and a second end, and a square-shaped opening formed from the first end through the member to the second end. The method includes the use of a tool having a corresponding square-shaped tip for holding and transporting the staking rod to the vicinity of the leader block which receives the leader tape in a substantially cylindrical opening. The staking rod is then inserted into the opening formed in the leader block with its substantially flat sides adjacent to the mouth of the opening. The staking rod is then rotated by the tool to a point where its substantially curved sides create an interference fit with the wals of the opening formed in the leader block, permanently trapping the leader tape in position. The tool is then withdrawn from the staking rod.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments of the present invention will now be described with reference to the drawings included herewith.

Figure 1:
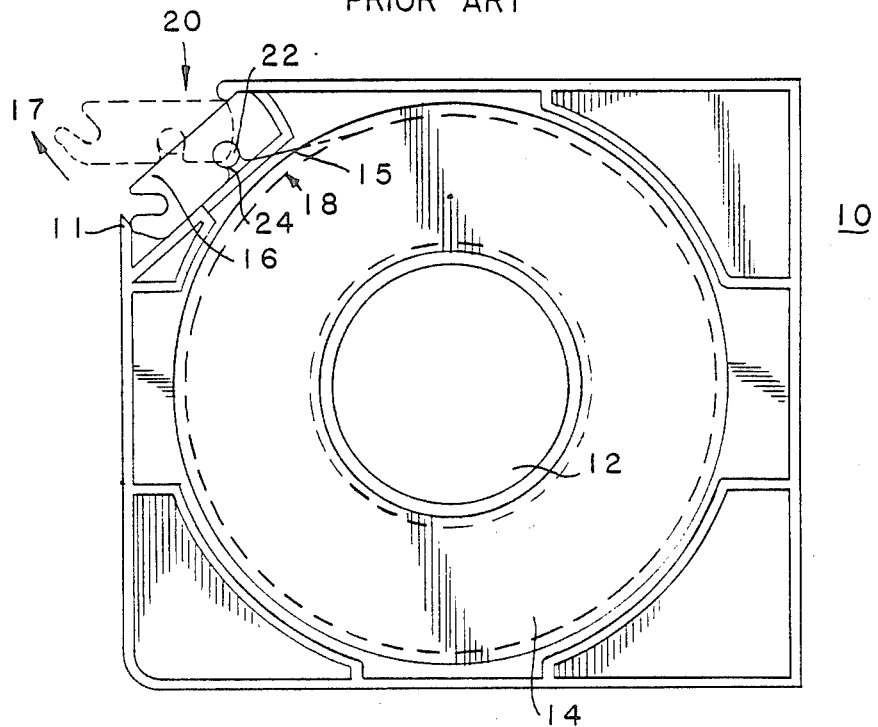
FIG. 1 is a plan view of a conventional, single reel, magnetic tape cartridge, illustrating particularly orientation of the leader block.
Figure 2:
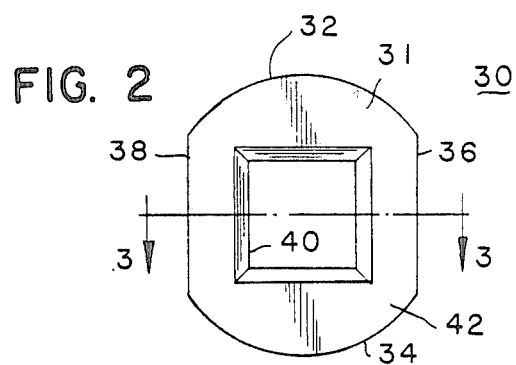
FIG. 2 is a top view of a preferred embodiment of the staking rod according to the present invention.
Figure 3:
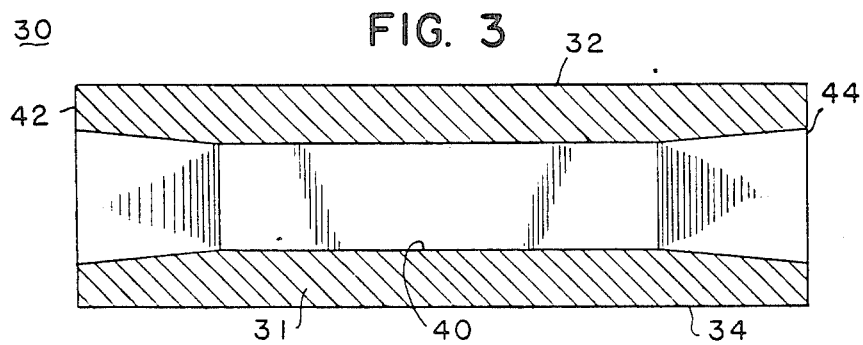
FIG. 3 is a side, cross-sectional view of the preferred embodiment of the staking rod of the present invention shown in FIG. 2 taken along lines 3—3.

As shown in FIGS. 2 and 3, the staking rod 30 according to the present invention is substantially cylindrical in shape. More particulary, the staking rod 30 is preferably an elongated, injection molded member 31 having two opposed, substantially curved, longitudinal sides 32 and 34 and two opposed, substantially flat, longitudinal sides 36 and 38 which are parallel. The staking rod 30 also includes a first end 42 and a second end 44. An opening 40 is formed preferably through member 31 from the first end 42 to the second end 44. In an alternate embodiment, the opening 40 is formed merely at the first end 42 and is not continuous through the staking rod 30. The opening 40, is preferably square in cross-section but may have other cross-sectional shapes, such as a triangle or a rectangle. Because the staking rod 30 is injection molded of e.g., acetal, manufacturing tolerances unavailable in the prior art are now made possible.

Figure 5:
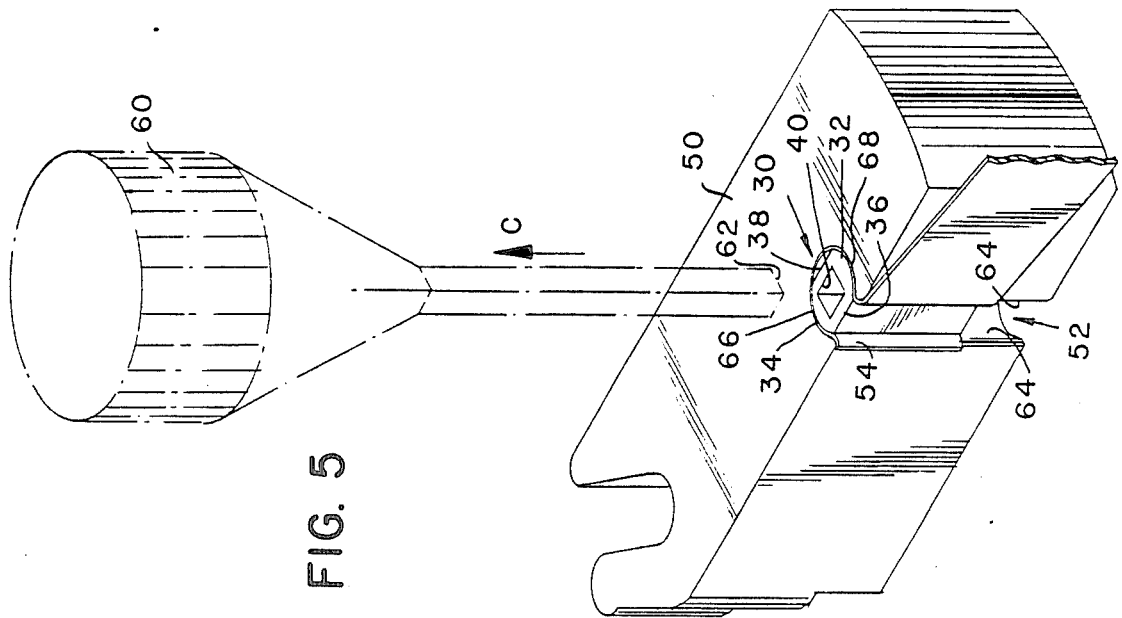
FIG. 5 is a perspective view showing the preferred embodiment of the method according to the present invention, illustrating particularly withdrawal of the tool once the staking rod is installed.
Figure 4:
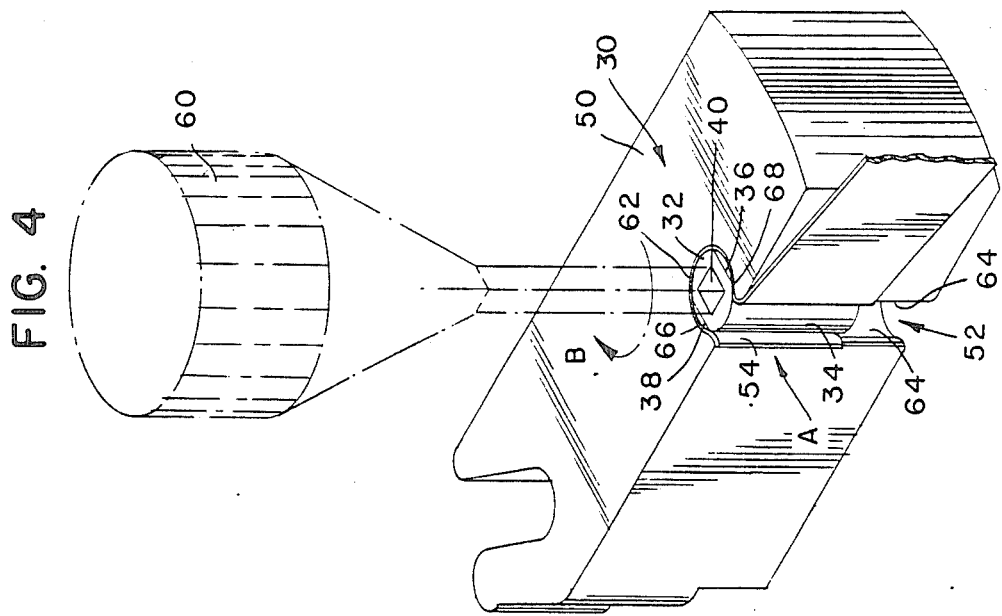
FIG. 4 is a perspective view showing the preferred embodiment of the method according to the present invention, illustrating particularly insertion and turning of the staking rod via a tool.

The method according to the present invention is illustrated by FIGS. 4 and 5 and includes the following steps. First, a leader block 50 is formed having a substantially cylindrical-shaped opening 52 formed therein. Then a leader tape 54 is positioned in the opening 52 formed in the leader block 50. Further, the staking rod 30 is formed as described above.

The opening 40 of the staking rod 30 allows the use of a tool 60 having a key or tip 62 corresponding in configuration to the opening 40 to manually or automatically enter, engage and transport the staking rod 30 to the opening 52 formed in the leader block 50. Since the staking rod 30 is narrower between sides 36 and 38 than the mouth 64 of the opening 52 formed in the leader block 50, the staking rod 30 can be moved into the opening 52 in a direction perpendicular to the longitudinal axis of the leader block 50, as shown by arrow "A" in FIG. 4, such that the sides 36 and 38 are adjacent but not touching the mouth 64. No interference fit is experienced at this time. Once inside the opening 52, the staking rod 30 is rotated, e.g., clockwise, about the longitudinal axis of the opening 52 formed in the leader block 50, as indicated by arrow "B" in FIG. 4. That is, the tool 60 is used to rotate the staking rod 30 to a point where its larger diameter, i.e., the distance between the opposing curved sides 32, 34 create an interference fit against the correspondingly curved walls 66 and 68 of the opening 52, permanently trapping or "staking" the leader tape 54 in position. Finally, the tool 60 is withdrawn from the staking rod 30 in a direction colinearly with the longitudinal axis of the opening 52, as indicated by arrow "C" in FIG. 5 and is advanced to engage another staking rod 30.

It can be seen that with the embodiments of the present invention, if, after inserting the staking rod 30 a molding imperfection is detected in either the tape cartridge components or the staking rod 30, the staking rod 30 may be removed easily via the same tool 60 to allow for disassembly and correction of the imperfection. For example, if the leader block 50 is separated for replacement or repair, the staking rod 30 can be retained for future use.

Overall, this invention provides a relatively simple design for a staking rod and related method of assembly which are particularly suited for automation since control of the staking rod during assembly is greatly enhanced. Thus, the present invention enjoys both the advantages of economical production and facilitated assembly and disassembly.

The above described invention has been shown to be of the type intended for use in a single reel tape cartridge. However, the invention can be similarly applied to tape reels for use in audio or other recording and/or reproducing apparatus.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims and their equivalents.

What is claimed is:

1. A method for forming a leader block assembly for a tape cartridge, comprising the steps of:
    (a) forming a leader block having a sustantially cylindrical shaped opening with a mouth;
    (b) forming a staking rod including an elongated member having a substantially cylindrical shape with first and second ends, two opposing, substantialy curved, longitudinal sides, two opposing, substantially flat, longitudinal sides and an opening having a first configuration in the first end;
    (c) positioning a leader tape in the opening formed in the leader block;
    (d) inserting a tool having a tip with the first configuration into the corresponding opening formed in the staking rod;
    (e) transferring the staking rod via the tool to the vicinity of the opening formed in the leader block;
    (f) inserting the staking rod via the tool into the opening formed in the leader block, such that the substantially flat, opposing sides are adjacent to the mouth of the opening formed in the leader block;
    (g) turning the tool such that the opposing, substantially curved, longitudinal sides create an interference fit with the opening formed in the leader block; and (h) withdrawing the tool from the staking rod.

2. The method as recited in claim 1, wherein step (f) is performed in a direction perpendicular to the longitudinal axis of the opening formed in the leader block, step (g) is performed about the longitudinal axis of the opening formed in the leader block, and step (h) is performed in a direction colinear to the axis of the opening formed in the leader block.

3. The method as recited in claim 2, wherein the first configuration is a square shape in cross-section.

4. The method as recited in claim 3, wherein the step (b) is performed by injection molding.

5. A method for forming a tape cartridge, comprising the steps of:
   (a) forming a tape reel with tape thereon; (b) forming a housing for receiving the tape reel in rotational relation;
   (c) forming a leader block assembly, including
      (i) a leader block having a cylindrical-shaped opening with a mouth,
      (ii) a staking rod, including an elongated member having a substantially cylindrical shape and first and second ends, two opposing, substantially curved, longitudinal sides, two opposing, substantially flat, longitudinal sides and an opening having a first configuration in the first end, and
      (iii) positioning a leader tape between the staking rod and the opening formed in the eader block;
   (d) inserting a tool having a tip with the first configuration into the corresponding opening formed in the staking rod;
   (e) transferring the staking rod via the tool to the vicinity of the opening formed in the leader block;
   (f) inserting the staking rod via the tool into the opening formed in the leader block, such that the two opposing, substantially flat, sides are adjacent to the mouth of the opening formed in the leader block;
   (g) turning the tool such that the two opposing, substantially curved, longitudinal sides create an interference fit with the opening formed in the leader block;
   (h) withdrawing the tool from the staking rod.

6. The method as recited in claim 5, wherein step (f) is performed in a direction perpendicular to the longitudinal axis of the opening formed in the leader block, step (g) is performed about the longitudinal axis of the opening formed in the leader block, and step (h) is performed in a direction colinear to the axis of the opening formed in the leader block.

7. The method as recited in claim 6, wherein the first configuration is a square shape in cross-section.

8. The method as recited in claim 7, wherein step (c) (ii) is performed by injection molding.

* * * * *